United States Patent [19]

Glembocki et al.

[11] Patent Number: 5,198,667
[45] Date of Patent: Mar. 30, 1993

[54] METHOD AND APPARATUS FOR PERFORMING SCANNING TUNNELING OPTICAL ABSORPTION SPECTROSCOPY

[75] Inventors: Orest J. Glembocki, Alexandria; Eric S. Snow, Springfield, both of Va.

[73] Assignee: The United States of America as represented by the Secretary of the Navy, Washington, D.C.

[21] Appl. No.: 811,378

[22] Filed: Dec. 20, 1991

[51] Int. Cl.$^5$ ............................................. G01N 25/00
[52] U.S. Cl. ..................................... 250/306; 250/307
[58] Field of Search ..................... 250/306, 307, 423 F

[56] References Cited

U.S. PATENT DOCUMENTS

| | | | |
|---|---|---|---|
| 4,343,993 | 8/1982 | Binnig et al. | 250/306 |
| 4,837,435 | 6/1989 | Sakuhara et al. | 250/306 |
| 4,861,990 | 8/1989 | Coley | 250/306 |
| 4,870,352 | 9/1989 | Koechner | 250/310 |
| 4,918,309 | 4/1990 | Beha et al. | 250/306 |
| 4,921,346 | 5/1990 | Tokumoto et al. | 250/306 |
| 4,941,753 | 7/1990 | Wickramasinghe | 250/307 |
| 4,942,299 | 7/1990 | Kazmerski | 250/306 |
| 4,985,627 | 1/1991 | Gutierrez et al. | 250/306 |
| 5,003,815 | 4/1991 | Martin et al. | 250/305 |
| 5,028,778 | 7/1991 | Ninomiya et al. | 250/305 |

OTHER PUBLICATIONS

Hamers et al., "Atomically Resolved Carrier Recombination at Si(111)-(7×7) Surfaces", Physical Review Letters, vol. 64, No. 9, pp. 1051-1054, Feb. 26, 1990.

Hamers et al., "Surface photovoltage on Si(111)-(7×7) probed by optically pumped scanning tunneling microscopy", J. Vac. Sci. Technol., vol. A8, No. 4, pp. 3524-3530, Jul./Aug. 1990.

Qian et al., "Scanning tunneling optical spectroscopy of semiconductors", Appl. Phys. Lett., vol. 58, No. 12, pp. 1295-1296, Mar. 25, 1991.

Primary Examiner—Jack I. Berman
Assistant Examiner—Jim Beyer
Attorney, Agent, or Firm—Thomas E. McDonnell; Charles J. Stockstill

[57] ABSTRACT

An apparatus for performing scanning tunneling optical absorption spectroscopy includes a scanning tunneling microscope tip positioned at a tunneling distance over a surface portion of a sample to be analyzed, biasing apparatus for producing an electric potential between said scanning tunneling microscope tip and said surface portion sufficient to cause a tunneling current to flow between said scanning tunneling microscope tip and said surface portion, illumination apparatus for illuminating said surface portion with modulated monochromatic light, and a detector for detecting an AC component of the tunneling current resulting from the modulated monochromatic light.

2 Claims, 2 Drawing Sheets

METHOD AND APPARATUS FOR PERFORMING SCANNING TUNNELING OPTICAL ABSORPTION SPECTROSCOPY

BACKGROUND OF THE INVENTION

1. Field of the Invention

The present invention generally relates to optical absorption spectroscopy and, more particularly, to a method and apparatus for performing scanning tunneling optical absorption spectroscopy. Optical absorption and modulated optical absorption spectra can be measured with spatial resolutions below the wavelength of the probing light using a scanning tunneling optical absorption spectroscopy according to the present invention.

2. Description of the Prior Art

Optical absorption spectra are obtained in conventional optical absorption spectroscopy by the passage of probing light from a light source through a selectively absorbing sample that is cooler than the light source. The spatial resolution of conventional optical absorption spectroscopy is limited to a wavelength of the probing light. Because of this limitation in spatial resolution, it has not been possible to use conventional optical absorption spectroscopy to optically probe individual features at the micron scale.

SUMMARY OF THE INVENTION

Accordingly, it is a general object of the present invention to provide a method and apparatus for performing enhanced optical absorption spectroscopy which enables spatial resolution below the wavelength of the probing light, e.g. on the micron scale.

It is a more specific object of the present invention to provide a method and apparatus for performing scanning tunneling optical absorption spectroscopy having a spatial resolution below the micron scale.

Still another object of the present invention is to provide a method and apparatus for analyzing the absorption or modulated absorption spectra along with the structural topography of a sample.

The foregoing and other objects of the present invention are accomplished by an apparatus for performing scanning tunneling optical absorption spectroscopy that includes a scanning tunneling microscope tip positioned at a tunneling distance over a portion of a surface of a sample to be analyzed, a biasing device for producing an electric potential between the scanning tunneling microscope tip and the surface portion sufficient to cause a tunneling current to flow between the scanning tunneling microscope tip and the surface portion, an illumination device for illuminating the surface portion with modulated monochromatic light, and a detector for detecting an AC component of the tunneling current resulting from the modulated monochromatic light.

According to the present invention, a preferred method of performing scanning tunneling optical absorption spectroscopy includes the steps of positioning a scanning tunneling microscope tip at a tunneling distance over a portion of a surface of a sample to be analyzed, producing an electrical potential between the scanning tunneling microscope tip and the surface portion sufficient to cause a tunneling current to flow between the scanning tunneling microscope tip and the surface portion, illuminating the surface portion with modulated monochromatic light, and detecting an AC component of the tunneling current resulting from the modulated monochromatic light.

These and other features and advantages of the present invention will become more apparent with reference to the following detailed description and drawings. However, the drawings and description are merely illustrative in nature and not restrictive.

BRIEF DESCRIPTION OF THE DRAWINGS

The accompanying drawings illustrate several aspects of the present invention, and together with the descriptions serve to explain the principles of the present invention. In the drawings.

DETAILED DESCRIPTION OF THE PREFERRED EMBODIMENTS

The present invention includes a conventional scanning tunneling microscope and utilizes the high spatial resolution thereof so as to overcome the inherent spatial resolution limitations of conventional optical absorption spectroscopy. A conventional scanning tunneling microscope is described in U.S. Pat. No. 4,343,993, which is hereby incorporated by reference. Conventional scanning tunneling microscopes are commercially available from many manufacturers including W. A. Technologies; and Microscience, Inc., of Norwell, Mass.

In a conventional scanning tunneling microscope, a sharply pointed, electrically conductive tip is placed at a tunneling distance, e.g., on the order of one nanometer from a surface portion of a sample to be analyzed. An electric potential is applied between the tip and the surface portion in order to cause a tunneling current to flow therebetween. The tunneling current, which is extremely sensitive to changes in the gap distance between the tip and the surface portion, results because electron clouds of the atoms at the apex of the tip and at the surface portion touch. A feedback system controls the gap distance between the tip and the surface portion, so that the tunneling current remains constant. A plot of the surface topography of the sample is generated by detecting the change in gap distance which is required in order to keep the tunneling current constant. Alternatively, instead of using a feedback system to control the gap distance, the change in tunneling current may be detected in order to plot the surface topography of the sample.

In a conventional tunneling scanning microscope, changes in the tunneling current resulting from a change in gap distance should be as large as possible in order to produce a high resolution plot of the surface topography of the sample. Because the tunneling current is more sensitive to changes in gap distance from a higher conductivity sample than a lower conductivity sample, a metal layer is conventionally deposited on the surface of a lower conductivity sample by evaporation or sputtering in order to increase the resolution of the plot of the surface topography of the lower conductivity sample. Alternatively, it is known to provide a light source to irradiate a lower conductivity sample with light to increase the conductivity of the lower conductivity sample, and thereby increase the resolution of the plot of the surface topography of the lower conductivity sample. See, for example, U.S. Pat. No. 4,837,435, which is incorporated by reference herein.

Figure 1:
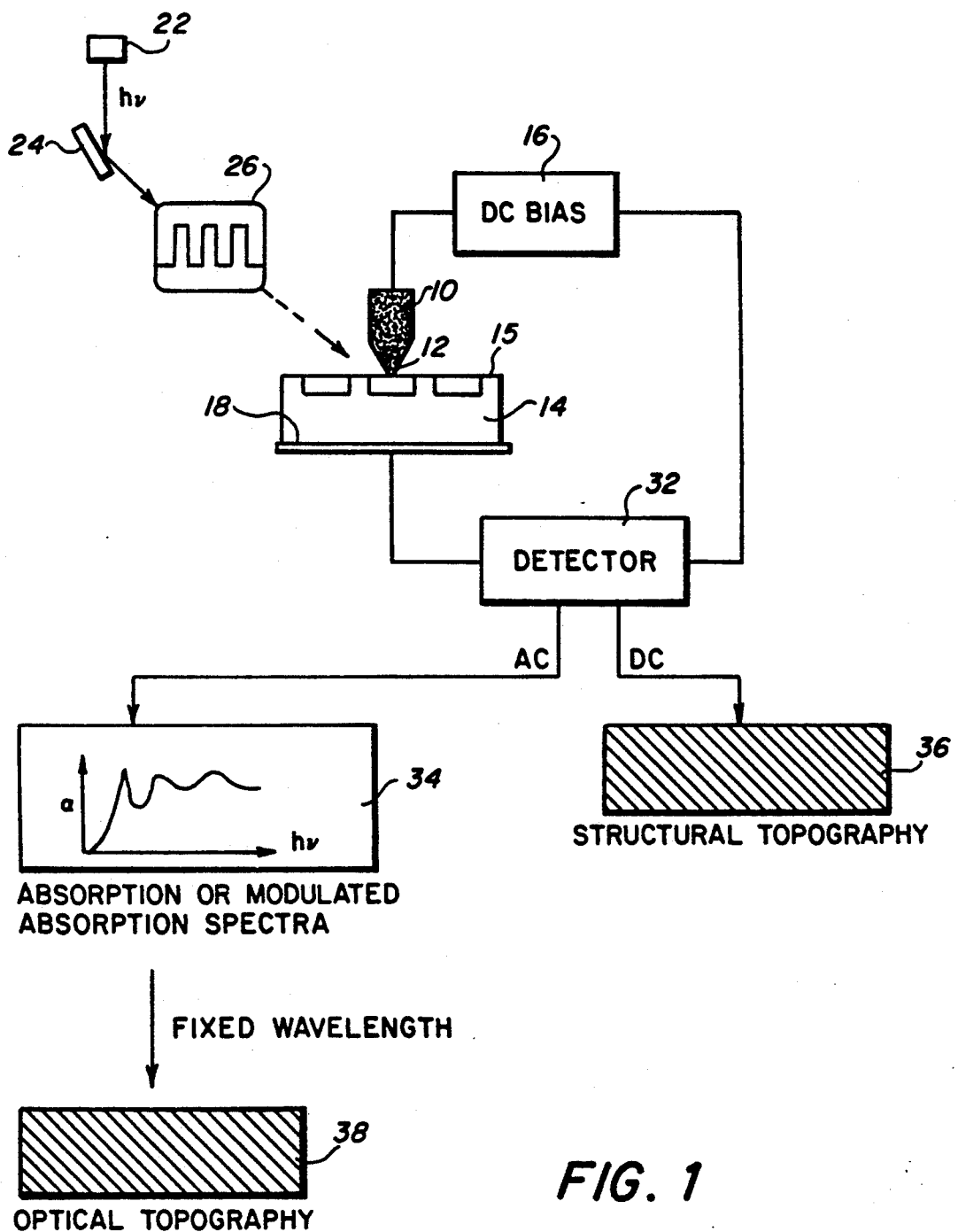
FIG. 1 is a schematic representation of an apparatus for performing scanning tunneling optical absorption spectroscopy according to the present invention.

Unlike a conventional scanning tunneling microscope, however, the present invention does not merely plot the surface topography of a sample. FIG. 1 shows a schematic representation of an apparatus for performing scanning tunneling optical absorption spectroscopy according to the present invention. A sharply pointed tip 10 of a conventional scanning tunneling microscope is positioned at a tunneling distance over a surface region 12 of a sample 14 having an upper surface 15. Surface region 12 is the portion of upper surface 15 over which the sharply pointed apex of tip 10 is positioned. The tunneling distance between tip 10 and surface region 12 is on the order of one nanometer. A constant DC bias 16 is applied between tip 10 and a back surface 18 of sample 14. The gap between tip 10 and surface region 12 forms a barrier to tunneling current, such that the tunneling current is exponentially related to the gap distance between tip 10 and surface region 12. Consequently, small changes in the gap, that is, the distance between tip 10 and surface region 12 will produce large changes in tunneling current.

A scanning tunneling optical absorption spectrometer according to the present invention further includes a monochromatic light source 22, such as a dye laser (e.g., Coherent Model DR-599 Dye Laser) or a monochrometer (e.g., Spex Model 1681 Monochrometer) and a suitable lamp (e.g., Oriel Model 6130 Tungsten Lamp Source), for producing a beam of monochromatic light having an energy $h\nu$. The beam of monochromatic light is then passed through an optic system 24, such as mirrors and lenses, and through a modulator 26, such as a chopper (e.g., HMS Model 220 Light Beam Chopper), a polarization modulator (e.g., Hinds International Inc., Model PEM-80, Photoelastic Modulator System) or a wavelength modulator. Finally, the resulting modulated monochromatic light is directed onto surface region 12. The modulated monochromatic light need not be directed solely onto surface region 12, but may additionally illuminate any portion of upper surface 15 adjacent to surface region 12.

Figure 2A:
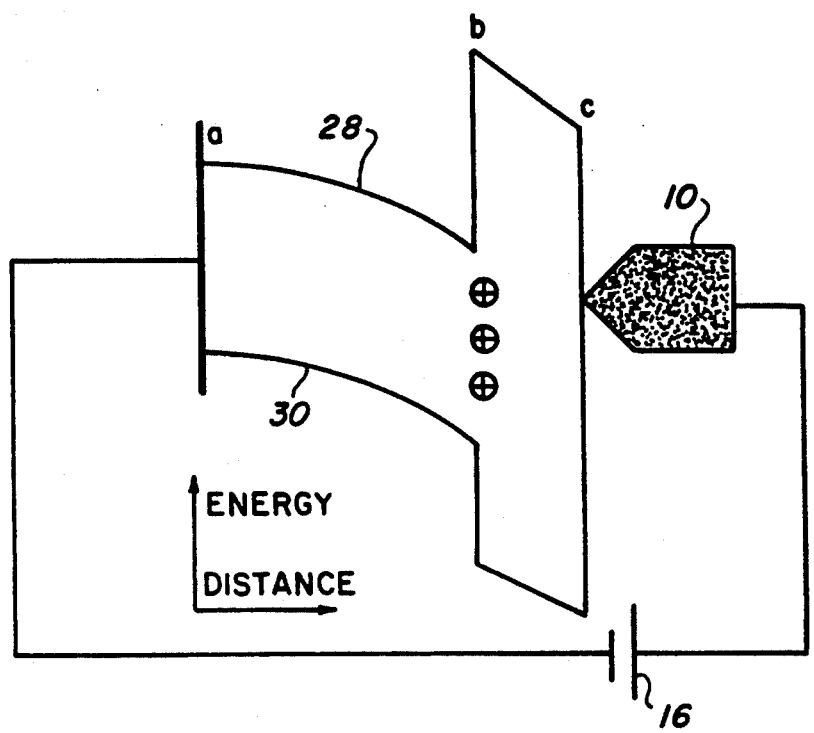
FIGS. 2A and 2B are schematic representations of a mechanism for explaining scanning tunneling optical absorption spectroscopy according to the present invention.
Figure 2B:
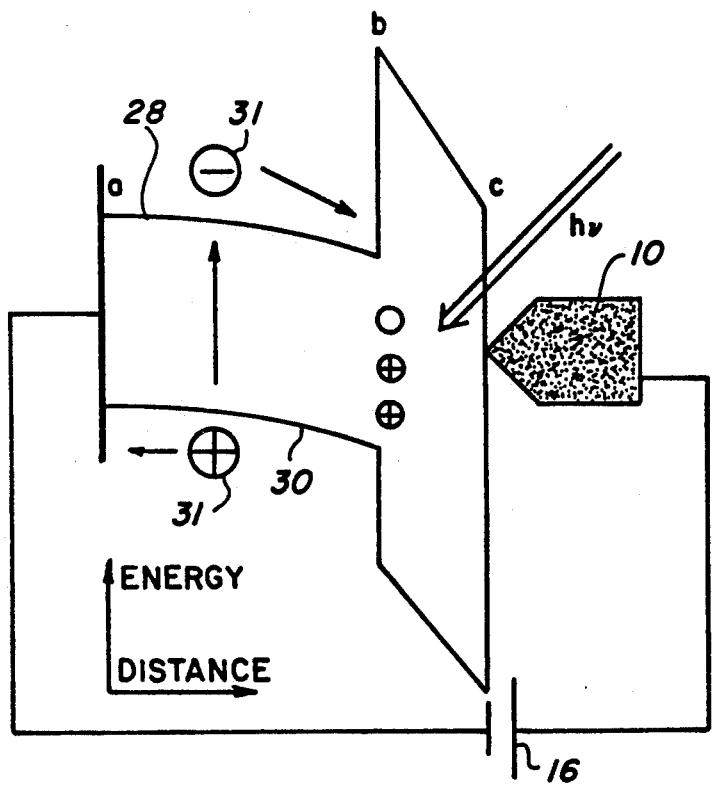

Referring to FIGS. 2A and 2B, a mechanism of scanning tunneling optical absorption spectroscopy according to the present invention will be explained in the case where modulator 26 is a chopper. In FIGS. 2A and 2B, energy is plotted on the ordinate, while distance is plotted on the abscissa. Distance points a, b and c respectively correspond to back surface 18, surface region 12 and tip 10. Thus, the gap distance is c−b and the thickness of sample 14 (a semiconductor in this example) is b−a. A conductance band 28 and a valence band 30 of sample 14 and the gap between sample 14 and tip 10 are plotted in FIGS. 2A and 2B. The surface charge of surface region 12 is shown in FIGS. 2A and 2B as a column of ⊕ symbols located at distance point b. The number of ⊕ symbols indicates surface charge density.

In FIG. 2A, a mechanism of scanning tunneling optical absorption spectroscopy according to the present invention is shown in a state where modulator 26 has interrupted the monochromatic light from monochromatic light source 22, so that the monochromatic light does not illuminate surface region 12. On the other hand, in FIG. 2B, a mechanism of scanning tunneling optical absorption spectroscopy according to the present invention is shown in a state where modulator 26 has not interrupted the monochromatic light from monochromatic light source 22, so that the monochromatic light having an energy $h\nu$ illuminates surface region 12. As shown in FIG. 2B in relation to 2A, when the monochromatic light illuminates surface region 12, it produces a photocurrent of photoexcited carriers 31 that reduces the surface charge density at distance point b, i.e., surface region 12. This leads to detectable changes in the tunneling current as modulator 26 interrupts and transmits the monochromatic light. These changes are directly and proportionally related to the absorption coefficient of surface region 12 of sample 14 at the wavelength of the modulated monochromatic light.

Referring back to FIG. 1, in the case where modulator 26 is a chopper as discussed above relative to the mechanism shown in FIGS. 2A and 2B, the beam of monochromatic light is interrupted at regular intervals. The changes in the tunneling current due to interruption and transmission of the beam of monochromatic light onto surface region 12 caused by the chopper are directly and proportionally related to the absorption coefficient of surface region 12 at the wavelength of the modulated monochromatic light.

In the case where modulator 26 is a polarization modulator, the polarization of the beam of monochromatic light is alternated at regular intervals. For example, the polarization of the beam of monochromatic light is alternated between two values at regular intervals. The resulting changes in the tunneling current are directly and proportionally related to the difference in the absorption coefficient of surface region 12 at the wavelength of the monochromatic light as the polarization of the monochromatic light is alternated by the polarization modulator. Such polarization information is useful in the study of materials which have preferred polarizability.

In the case where modulator 26 is a wavelength modulator, the wavelength of the beam of monochromatic light is alternated at regular intervals. For example, the wavelength of the beam of monochromatic light is alternated between two values at regular intervals. The wavelength modulator may include a vibrating quartz plate positioned in the path of the beam of monochromatic light before it exits monochromatic light source 22, e.g., a lamp spectrometer tunable monochromatic source. The resulting changes in the tunneling current are directly and proportionally related to the difference in the absorption coefficient of surface region 12 as the wavelength of the monochromatic light is alternated by the wavelength modulator.

The modulation frequency of modulator 26 is chosen so that the feedback circuitry of the scanning tunneling microscope does not respond to it, i.e., so that the scanning tunneling microscope does not change the position of tip 10 relative to surface region 12 due to a change in tunneling current resulting from the modulated monochromatic light. This can be accomplished, for example, by using a modulation frequency higher than the response time of the scanning tunneling microscope feedback circuitry. Alternatively, a conventional notch filter can be inserted into the feedback circuitry of the scanning tunneling microscope such that the scanning tunneling microscope does not respond to changes in tunneling current that occur at the modulation frequency.

A detector 32 (FIG. 1) detects and extracts an AC or modulated component of the tunneling current. For example, a phase sensitive detection circuit, such as a lock-in circuit (e.g., EG&G Model PAR 5210 Lock-In Amplifier), may be used to detect and extract the AC component. Because the amplitude of the AC component of the tunneling current is directly and proportionally related to the photocurrent of photoexcited carriers produced by the modulated monochromatic light, the difference between the maximum and minimum amplitudes of the AC component of the tunneling current provides the absorption coefficient of surface region 12 at the wavelength of the modulated monochromatic light when modulator 26 is a chopper. Similarly, the difference between the maximum and minimum amplitudes of the AC component of the tunneling current provides the difference in absorption coefficient of surface region 12 at the wavelength and polarization values of the modulated monochromatic light when modulator 26 is a polarization modulator. Likewise, the difference between the maximum and minimum amplitudes of the AC component of the tunneling current provides the difference in absorption coefficient of surface region 12 at the wavelengths of the modulated monochromatic light when modulator 26 is a wavelength modulator.

Moreover, an absorption or modulated absorption spectra 34 of surface region 12 may be obtained by additionally changing the wavelength of the beam of the monochromatic light. For example, in the case where modulator 26 is a chopper, the wavelength of the beam of monochromatic light produced by monochromatic light source 22 may be sequentially changed at a frequency lower than the chopping frequency of modulator 26 to obtain modulated absorption spectra 34.

As in a conventional scanning tunneling microscope, the structural topography 36 may be obtained by detecting changes in the DC component of the tunneling current as tip 10 is scanned across upper surface 15. Structural topography 36 obtained from the DC component of the tunneling current may be coordinated with absorption or modulated absorption spectra 34 obtained from the AC component of the tunneling current at the same location as tip 10 is scanned across upper surface 15.

Alternatively, the optical absorption topography 38 of upper surface 15 may be obtained from the AC component of the tunneling current. This is accomplished by fixing the wavelength of the beam of the monochromatic light from monochromatic light source 22 as tip 10 is scanned across upper surface 15.

Because the AC component of the tunneling current results only from changes in the surface potential caused by the modulated monochromatic light absorbed in surface region 12, the lateral spatial resolution of the present invention can be much less than in conventional optical absorption spectroscopy, wherein the spatial resolution is limited to the wavelength of the probing light. Consequently, the present invention permits optical absorption spectroscopy having a spatial resolution below the micron scale and is therefore useful in analyzing many types of samples.

For example, the present invention is useful in analyzing the structure of semiconductors. If a semiconductor structure is not confined, i.e., not limited in its extent, along the direction between tip 10 and surface 15, the spatial resolution is limited by long range Coulomb interactions of the photoexcited carriers, and is approximately equal to the depletion layer width of the semiconductor, which can be adjusted by doping or bias. On the other hand, this limitation in spatial resolution does not apply to semiconductor structures that are confined along the direction between tip 10 and surface 15, e.g., quantum dots and other three-dimensional nanostructures located near surface 15.

In conventional optical absorption spectroscopy, light having a wavelength of about 1000 nanometers is used to probe the band gaps of semiconductors. Consequently, the resolution of such conventional optical spectroscopy techniques are limited to a resolution of about 1000 nanometers, i.e., the wavelength of the probing light. Thus, because the lateral spatial resolution of the present invention is below the micron scale, the present invention represents an improvement of two orders of magnitude over such conventional optical absorption spectroscopy techniques. In addition, because of increased lateral spatial resolution, the present invention permits optical absorption spectra to be obtained from single quantum wire wells and dots having nanometer dimensions. Thus, according to the present invention, individual nanostructures may be probed, rather than the whole array, as is the case in conventional optical absorption spectroscopy.

The present invention may also be applied to study features such as regions of alloy clustering in epitaxial growth of alloy systems, strain and alloy compositions of nodules formed during spinodal decomposition observed during epitaxial growth, and distributions of strain near dislocations. In addition, in quantum well systems, the present invention makes it possible to obtain information about monolayer fluctuations in well thickness.

Furthermore, electrical information, such as spatially local frequency responses of surface states and flat band conditions can be obtained according to the present invention, as well as local carrier diffusion lengths and depletion layer widths.

Numerous modifications and adaptations of the present invention will be apparent to those skilled in the art. For example, the present invention may be modified to obtain high spatial resolution photoluminescence by applying an AC bias between tip 10 and back surface 18. The AC bias would modulate the space charge field of sample 14, and thus modulate the thickness of the depletion layer. This modulation changes the thickness of the region in which photoluminescence will not occur. Consequently, photoluminescence which is excited by a tunable laser system, for example, across a large spatial region can be modulated locally, within the spatial region affected by tip 10, i.e., surface region 12. Thus, the AC component of the photoluminescence will be only from surface region 12. This modification of the present invention allows for impurity effects and carrier dynamics. Thus, it is intended by the following claims to cover all modifications and adaptations which fall within the true spirit and scope of the present invention.

What is claimed is:

1. An apparatus for performing scanning tunneling optical absorption spectroscopy, said apparatus comprising:
   a scanning tunneling microscope tip positioned at a tunneling distance over a surface region of a sample to be analyzed;
   bias means for producing an electric potential between said scanning microscope tip and said surface region sufficient to cause a tunneling current to flow between said scanning tunneling microscope tip and said surface region;

illumination means for illuminating said surface region with a modulated monochromatic light, said illumination means including:
  a monochromatic light source for producing monochromatic light; and
  light modulator means for producing said modulated monochromatic light by modulating said monochromatic light produced by said monochromatic light source, said light modulator means including a polarization modulator; and
means for detecting an AC component of said tunneling current resulting from said modulated monochromatic light and for measuring a polarization based absorption coefficient of said surface region based on said AC component.

2. A method of performing scanning tunneling optical spectroscopy, said method comprising the steps of:
  positioning a scanning tunneling microscope tip at a tunneling distance over a surface region of a sample to be analyzed;
  producing an electrical potential between said scanning tunneling microscope tip and said surface region sufficient to cause a tunneling current to flow between said scanning tunneling microscope tip and said surface region;
  illuminating the surface region with modulated monochromatic light; said illuminating step including the steps of:
    producing monochromatic light; and
    modulating said monochromatic light to form said modulated monochromatic light, said step of modulating said monochromatic light including the step of:
      modulating the polarization of said monochromatic light; and
  detecting an AC component of the tunneling current resulting from said modulated monochromatic light for measuring a polarization based absorption coefficient of said surface region.

* * * * *